United States Patent [19]

Violante De Dionigi

[11] Patent Number: 4,699,043

[45] Date of Patent: Oct. 13, 1987

[54] REDUNDANT SERVOACTUATOR UNIT PARTICULARLY TO OPERATE THE FLIGHT CONTROL MECHANISMS IN AIRCRAFT

[75] Inventor: Francesco Violante De Dionigi, Milan, Italy

[73] Assignee: Magnaghi Oleodinamica S.P.A., Milan, Italy

[21] Appl. No.: 726,593

[22] Filed: Apr. 23, 1985

[30] Foreign Application Priority Data

Aug. 31, 1984 [IT] Italy .............................. 22483 A/84

[51] Int. Cl.$^4$ ............................................. F01L 15/00
[52] U.S. Cl. ...................................... 91/182; 91/368; 91/509; 91/523; 92/146
[58] Field of Search .................... 92/118, 146; 91/182, 91/368, 530, 509, 523

[56] References Cited

U.S. PATENT DOCUMENTS

| | | | |
|---|---|---|---|
| 3,831,493 | 8/1974 | Wanger | 92/61 |
| 3,915,064 | 1/1975 | Dancs | 92/118 |
| 3,965,798 | 6/1976 | Estlick | 92/68 |
| 4,082,115 | 4/1978 | Gibb | 91/368 |
| 4,157,066 | 6/1979 | Pretty | 91/171 |
| 4,300,352 | 11/1981 | Williams | 92/68 |

FOREIGN PATENT DOCUMENTS 2044053  3/1972  Fed. Rep. of Germany ........ 91/509

*Primary Examiner*—Abraham Hershkovitz
*Attorney, Agent, or Firm*—Karl F. Ross; Herbert Dubno

[57] ABSTRACT

A servoactuator unit to operate flight-control mechanisms, in particular for control of the position of the oscillating plate which adjusts the cyclic pitch and collective pitch of helicopter rotors, in which two pairs of hydraulic actuators are used, connected together in parallel, arranged with their axes parallel and close together like the diagonals of a quadrilateral, their rods connected together at their end and acting on the said oscillating plate and the cylinders also being connected together at the back. Each pair of actuators is powered, through a servovalve, by an independent hydraulic circuit so as to enable operation even in the event of one of the pairs breaking down, with symmetrical stress being placed on the pair of actuators during operation.

2 Claims, 4 Drawing Figures

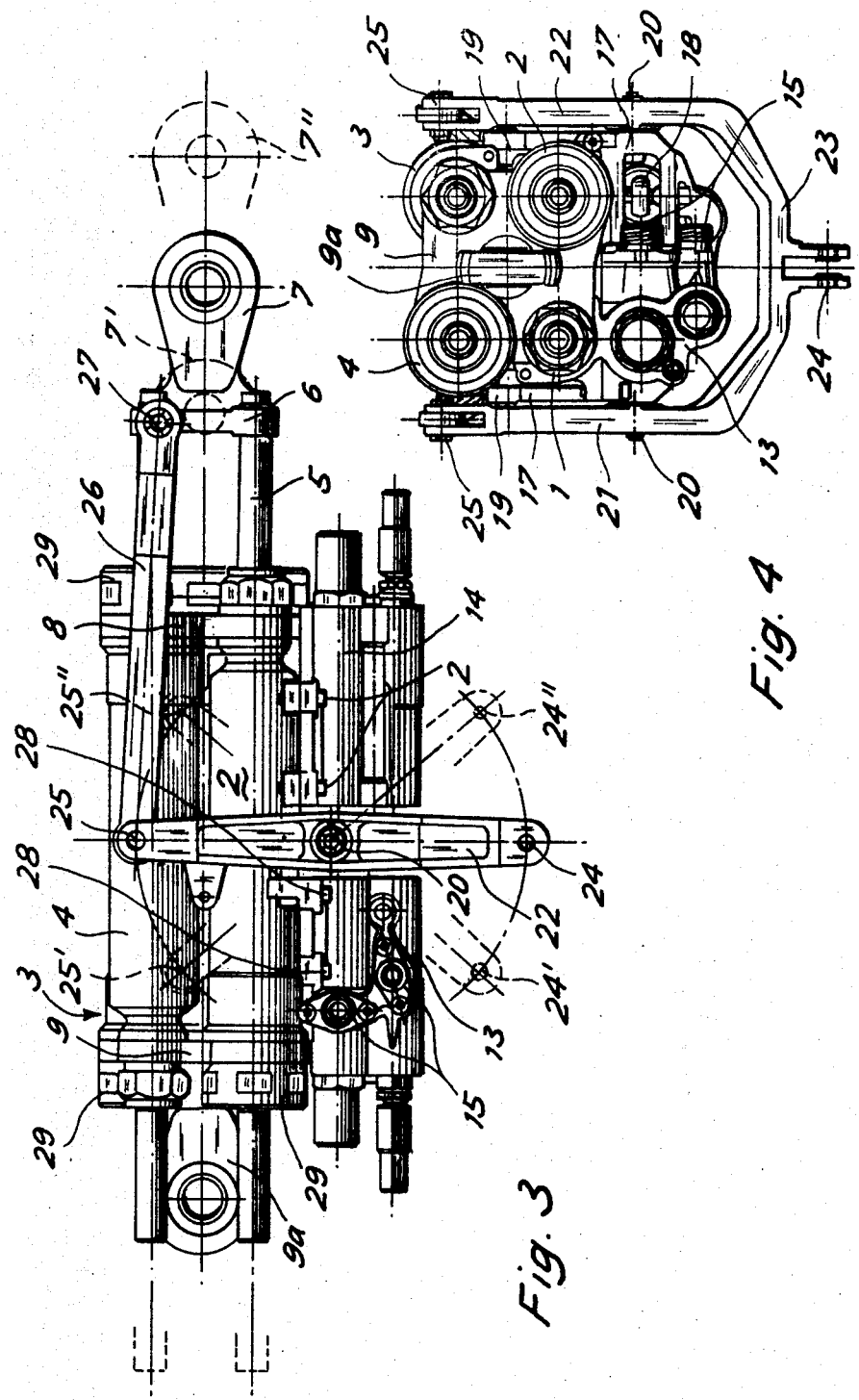

REDUNDANT SERVOACTUATOR UNIT PARTICULARLY TO OPERATE THE FLIGHT CONTROL MECHANISMS IN AIRCRAFT

FIELD OF THE INVENTION

This invention relates to servoactuator units for use in operating flight control mechanisms, and in particular for controlling the position of the oscillating plate which adjusts the cyclic pitch and collective pitch of helicopter rotors.

BACKGROUND OF THE INVENTION

In order to control the flight of aerodynes such as helicopters, it is necessary for the blades of the rotor to be acted upon so as to vary their pitch, both collectively for all the blades, in order to control the lift of the rotor, and cyclically, at each rotation, in order to adjust the inclination of the rotor's plane of rotation, and control the trim and traverse in a horizontal direction.

For this purpose, there is usually provided an oscillating plate positioned concentrically with the rotor shaft and linked to the rotor blades, the inclination of the said plate being controlled by the pilot by means of three servoactuators which determine the spatial trim.

These servoactuators are therefore essential for flight, and thus each one usually comprises, redundantly, two actuators linked together, powered by two separate hydraulic circuits, so as to guarantee manoeuvring with at least one of them, even in the event the other, or its feeding circuit, being is faulty or damaged.

For this purpose, various embodiments are possible in which the rods of the said actuators aligned with each other, are inter-connected, or else the said actuators are positioned in side-by-side relationship with the eyelet for connection to the said oscillating plate being carried by a yoke or the like, connecting the actuator rods.

The first solution, with aligned actuators, occupies little room transversely and the stresses exerted are completely symmetrical, but occupies a great deal of space longitudinally, i.e. almost twice the space necessary for a single actuator, and is thus unsuitable for some applications.

By contrast, the solution whereby the actuators are positioned side-by-side takes up more room transversely and moreover, in the event of emergency operation, with just one actuator working, there is misalignment between the direction of action of the actuator and the point of application of the resistance. This produces a bending moment in the yoke and in the actuator rod, with high stress which, under such conditions, limits the time for which they can be used safely and dictates that the parts in question be over-sized, thus considerably increasing their weight.

OBJECT OF THE INVENTION

An object of the invention is to provide a servoactuator unit which occupies little room longitudinally but offers, under all conditions of use, both normal and emergency, a symmetrical distribution of stress, so as not to cause bending moments and overstressing within its structure.

SUMMARY OF THE INVENTION

The desired object is achieved, according to the present invention, by means of a redundant servoactuator unit particularly for operating the flight control mechanisms of aircraft such as helicopters, comprising two pairs of hydraulic actuators connected together hydraulically in parallel and powered by two separate hydraulic circuits, the said pairs of connected actuators being arranged close together with their axes parallel and along the diagonals being connected together at one end by an essentially quadrangular front plate with an eyelet positioned centrally for connection to the said flight control mechanisms and the cylinders of the said actuators being connected together having, at the bottom end, a second plate with an eyelet positioned centrally for connection to a fixed structure within the aircraft.

Each of the said actuator pairs is powered by a valve connected to one of the separate hydraulic circuits, having its fixed outer body forming one piece with the cylinder of one of the said actuators, the moving elements of the valves being connected together by means of the integral operation of the said actuator pairs.

The valves are connected, by means of their moving elements, to a lever placed in an intermediary position between the points of connection to the lever of the mechanisms for the mechanical transmission of the drive and of the elements for the reaction control of the position of the front plate supported by the rods of the said actuators.

In a convenient embodiment, the lever element comprises a fork which encloses the cylinders of the said actuators, and connected in a central position to the arms of the fork are the moving elements of the valves, with the possible interposition of an auxiliary lever, with the drive transmission mechanisms being connected to the joiing element of the said arms, wherein one or more connecting rods (ideally at least two), pivoted at the other end in relation to the said front plate, are connected to the ends of the arm.

The actuators are of the through-rod type and doubleacting so as to create equal response conditions in both directions of action, the said eyelet for connection to the fixed structure being arranged between the rods of the actuators coming out at the back.

BRIEF DESCRIPTION OF THE DRAWING

FIG. 3 is a side view of the servoactuator shown in FIG. 2; and

FIG. 4 is a front view of the servoactuator shown in FIG. 2 in direction IV shown in FIG. 3.

SPECIFIC DESCRIPTION

Figure 1:
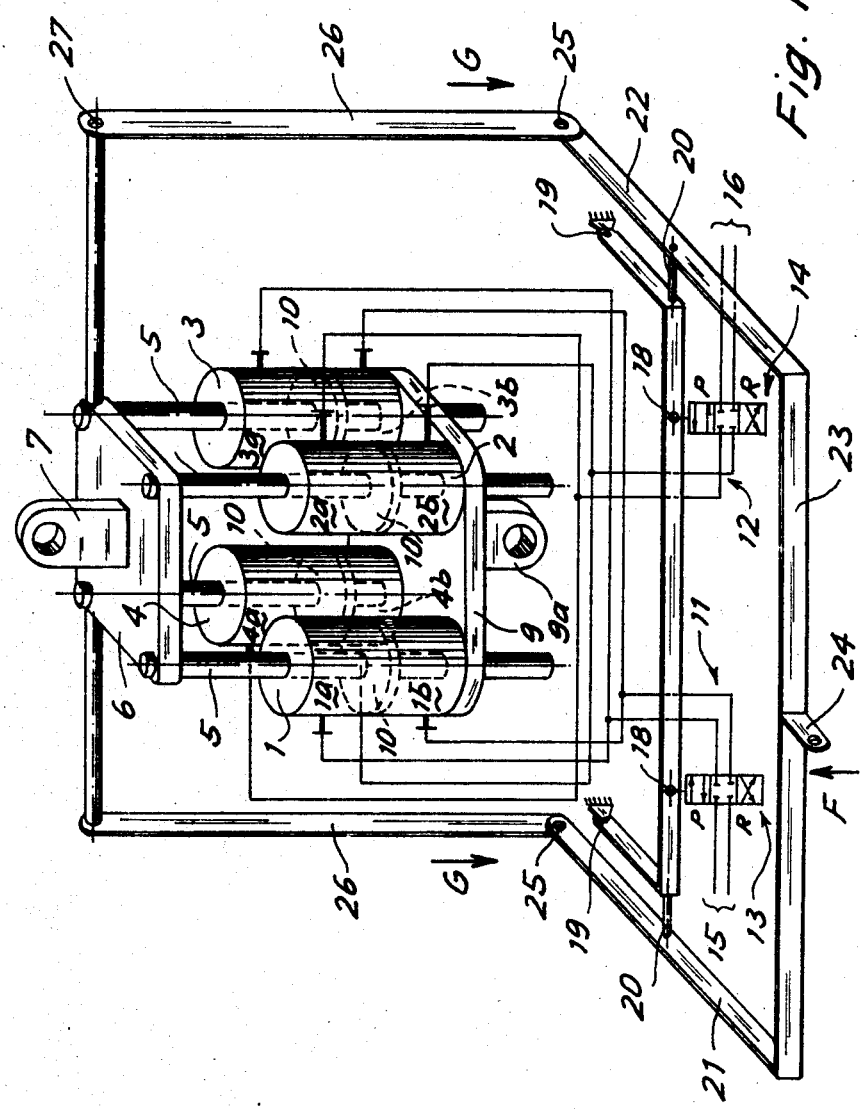
FIG. 1 is a structural and hydraulic layout, in a simplified form, of a servoactuator according to the invention.
Figure 2:
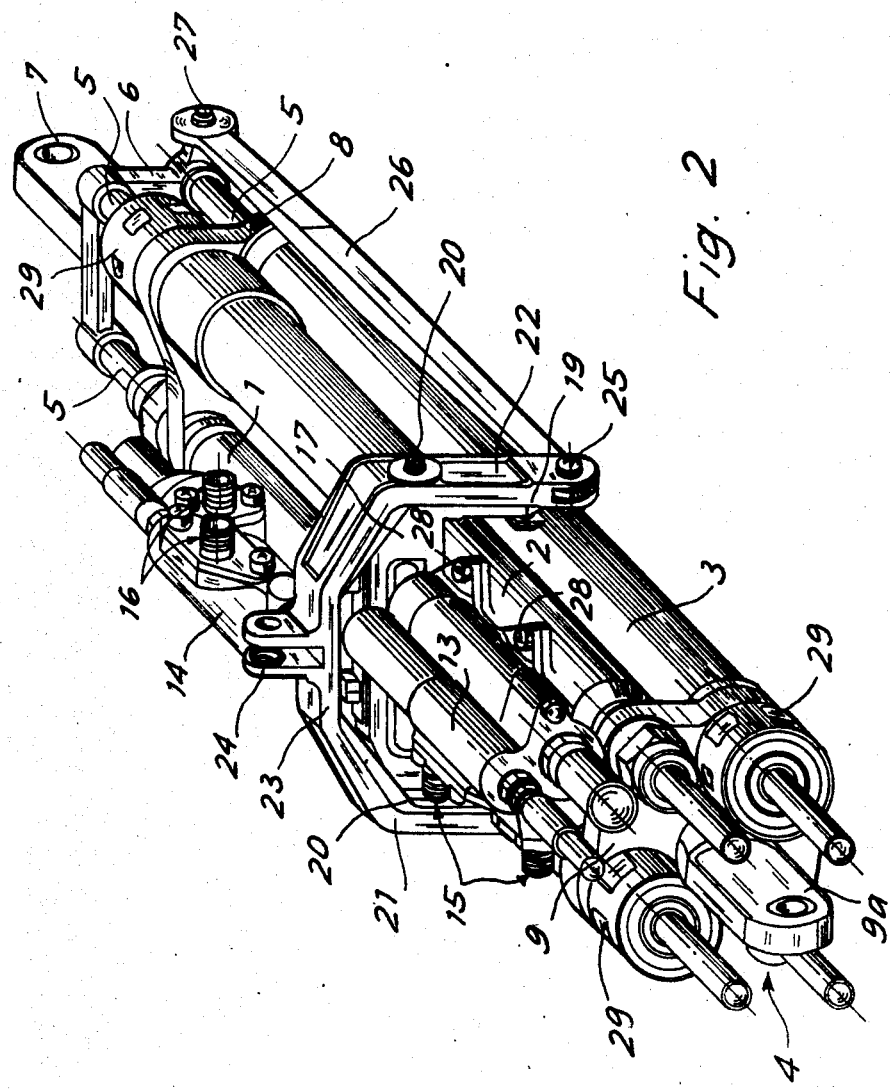
FIG. 2 is a view in perspective of the servoactuator unit in a realistic embodiment.

As shown schematically in FIG. 1 and in greater detail in FIGS. 2, 3 and 4, a servoactuator unit for operating the oscillating plate of the main rotor of a helicopter comprises four identical hydraulic actuators 1, 2, 3 and 4, having their respective rods 5 connected to a quadrangular plate 6 carrying an eyelet 7 constituting means for connection of the quadrangular plate 6 to the oscillating plate. The cylinders of the actuators are also connected together by means of a front plate 8, not shown in FIG. 1, and a back plate 9, supporting the eyelet 9a for connection to a fixed structure of the helicopter.

Each cylinder has a piston 10, forming one piece with the rod 5, which defines in the said cylinder two chambers, 1a, 1b; 2a, 2b; 3a, 3b; and 4a, 4b respectively. The feeding circuit, represented schematically in FIG. 1, provides the connection between chambers 1a and 3a; 1b and 3b; 2a and 4a; and 2b and 4b, thus joining the actuators together in diametrically-opposite pairs, with two parallel operating circuits 11 and 12.

The said circuits are controlled by two slide valves 13 and 14 which are identical and supplied by two separate and independent feeding circuits 15 and 16, each having a delivery line under pressure, marked "P" and a return line, marked "R". The movable slides of the valves 13 and 14, not shown in the Figure, are connected, as shown in the basic diagram illustrated in FIG. 1, to a fork lever 17, by means of ball joints 18.

The fork lever 17 has a fulcrum on the pins 19, which form one piece with the actuator cylinders, as can been seen in FIGS. 2 and 4 and is connected articulately, by means of a pair of coaxial pins 20, to the arms 21 and 22 of a fork 23, in an intermediate position on the former, between the attachment 24 for a servoactuator control rod and the pins 25 to connect together the two connecting rods 26, constrained articulately, at the opposite end, to the plate 6 by means of pins 27.

Appropriately, the distance between the axis of the pins 20 and the axis of the pins 25 is equal to the distance between the axis of rotation of the ball joints 18 and the said axis of the pins 25, or much the same, so as not to introduce excessive variations between the displacements of the pins 20 and the travels of the slides of the valves 13 and 14, connected to the joints 18, due to different lever arms.

The fork lever must be present in order to limit the angular travel imposed on the joints 18, which cannot tolerate large degrees of rotation, even in the presence of wide oscillations of the fork 23, corresponding to the minimum and maximum travels of the actuators. The fork lever 17 also makes it possible to transfer any orthogonal stress on the stems of the said slides of the valves 13 and 14 onto the cylinders, so as not to damage the said stems or shorten their life. The body of the valves 13 and 14, as can be seen in FIGS. 2, 3 and 4, forms one piece with the cylinders of the actuators, by means of the connecting screws 28.

As shown in the said FIGS. 2, 3 and 4, the actuators, of the through-rod type, are fitted at the minimum reciprocal distance, due also to the staggered arrangement of the bottoms 29 of the relative cylinders, so as to minimize the size of the unit.

The servoactuator unit according to the invention operates in the following way: drive from the pilot is transmitted, through transmission mechanisms, to the attachment 24, causing the latter to shift, in the direction of the arrow F in FIG. 1 for instance. This causes rotation of the fork 23, with its axis in the pins 25, which in turn causes the rotation of the fork lever 17 about the pins 19 and thus shifts the slide of the valves 13 and 14, connected to the lever 17 by the joints 18, in the same direction, supplying the upper chambers of the actuators 1a, 2a, 3a and 4a and thus causing the lowering of the plate 6 supporting the eyelet 7 and of the organs connected to it, until, through the connecting rods 26, the pins 25 have undergone a movement, in the direction of the arrow G in FIG. 1, of an extent equal or proportional to the movement of the attachment 24, in relation to the distances between the said attachment 24 and the axes of the pins 20 and 25. In this condition the slide of the valves 13 and 14 is brought back to a central position, cutting off the supply to the actuators, in the new position with their rods retracted.

In a similar way a drive acting in the opposite direction to that indicated by the arrow F causes the actuator rods to extend; the maximum possible travels in both directions are illustrated in FIG. 3 with a broken line and the parts identified by reference numbers with apostrophes ' and ".

Should there be any fault or damage in one of the two circuits 15 and 16, or in one of the valves 13 and 14, or in one of the actuators 1, 2, 3 and 4, the servoactuator is still able to function. Let us suppose, for example, that there is an interruption or breakage in circuit 15, the valve 13 becomes inoperative and shortcircuits the actuators 1 and 3. The drive is then transmitted to valve 14 alone which, through circuit 12, supplies the actuators 2 and 4 which arranged symmetrically in relation to the eyelet 7, can carry out their operations without additional mechanical bending stress being generated at the plate 6, rod 5 and the other organs of those actuators which have remained operational. This condition thus renders operation of the servocontrol unit possible under emergency conditions, without any time limit due to the danger of breakage through fatigue, since the symmetry of the loads in relation to normal operation is not changed.

It is also possible to pilot the aircraft by using, under normal conditions, just one of the feeding circuits 15 or 16, leaving the other in reserve for an emergency.

This use is not possible with the conventional arrangement, comprising two actuators side-by-side, with their rods connected to a yoke having the eyelet, positioned in the middle, for connection to the oscillating plate, since in such a structure there are load imbalances, and related bending moments, under all conditions in which the two actuators do not operate at the same time, and therefore, in such known devices, operation under emergency conditions, with just one feeding circuit operative and just one actuator in operation, must be for a limited period, offering fewer safety guarantees.

Moreover, the configuration according to the invention enables less space to be occupied transversely than is the case with the configuration having two actuators side-by-side, with the same thrust section, since it is possible to use cylinders of a smaller diameter.

The characteristics relating to the servovalves, structure, attachments of the actuators and so forth are based on the state of the art and are thus not described in detail. Many variants can be introduced without going beyond the spirit and scope of the present invention in its general characteristics. Furthermore, the servoactuator unit according to the invention can also be used in different situations, apart from for controlling helicopter rotors, which have the same requirements of safety, use, duration and so forth.

What is claimed is:

1. A redundant servoactuator unit for operating a flight-control mechanism of an aircraft, comprising:

four hydraulic actuators disposed close together with mutually parallel axes at the vertices of a quadrilateral, each of said hydraulic actuators comprising a cylinder, a piston in said cylinder subdividing the interior thereof into two compartments, and a rod connected to said piston extending from an end of said cylinder;

a substantially quadrangular front plate connected to the rods of said actuators;

a rear plate rigidly connecting said cylinders together;

an eyelet positioned centrally on said front plate for connection to said flight-control mechanism;

an eyelet positioned centrally on said rear plate for connection to a fixed structure in said aircraft;

two completely separate hydraulic circuits for operating said actuators, one of said hydraulic circuits comprising a first servovalve and branches connected to corresponding ones of said compartments of two diagonally opposite ones of said cylinders, the other of said hydraulic circuits comprising a second servovalve and branches connected to corresponding ones of said compartments of the other two diagonally opposite ones of said cylinders;

linkage means operatively coupling said front plate to both said servovalves for servoresponse movement of said servovalves upoon displacement of said front plate, said servovalves being effective to displace said front plate individually and jointly with symmetrical force application thereto, each of said valves having a body fixed to the body of the cylinder of one of said actuators and a moving element connected to said linkage, said linkage means including a first lever interconnecting said moving elements of said valves, a second lever pivotally connected by links to said front plate and to an operating element of said flight-control mechanism, said first lever being pivotally connected to said second lever at an intermediate location along the length thereof and being fulcrumed on said fixed structure.

2. The redundant servoactuator unit defined in claim 1 wherein each of said levers is a fork and two such links are provided, each connected to said front plate by a respective connecting rod.

* * * * *